(12) United States Patent
Hiramatsu et al.

(10) Patent No.: US 7,350,735 B2
(45) Date of Patent: Apr. 1, 2008

(54) SEAT BELT RETRACTOR

(75) Inventors: Koji Hiramatsu, Shiga (JP); Kenji Kitazawa, Hikone (JP)

(73) Assignee: Takata Corporation, Tokyo (JP)

( * ) Notice: Subject to any disclaimer, the term of this patent is extended or adjusted under 35 U.S.C. 154(b) by 405 days.

(21) Appl. No.: 11/008,599

(22) Filed: Dec. 10, 2004

(65) Prior Publication Data

US 2005/0134101 A1 Jun. 23, 2005

(30) Foreign Application Priority Data

Dec. 18, 2003 (JP) ............... 2003-421073

(51) Int. Cl.
*B65H 75/48* (2006.01)
(52) U.S. Cl. ............... 242/379.1; 242/382.2; 297/470; 297/476
(58) Field of Classification Search ........... 242/379.1, 242/382.2, 382; 297/470, 476
See application file for complete search history.

(56) References Cited

U.S. PATENT DOCUMENTS

| 5,924,641 | A | * | 7/1999 | Keller et al. ............. 242/379.1 |
| 6,012,667 | A | * | 1/2000 | Clancy et al. ........... 242/379.1 |
| 6,069,325 | A | | 5/2000 | Aoki |
| 6,216,972 | B1 | | 4/2001 | Röhrle |
| 6,241,172 | B1 | * | 6/2001 | Fugel et al. ............. 242/379.1 |
| 6,290,159 | B1 | | 9/2001 | Specht et al. |
| 6,416,008 | B1 | | 7/2002 | Fujii et al. |
| 6,435,441 | B1 | | 8/2002 | Kajiyama et al. |
| 6,616,081 | B1 | | 9/2003 | Clute et al. |
| 6,698,678 | B2 | | 3/2004 | Hori et al. |

FOREIGN PATENT DOCUMENTS

| DE | 196 04 483 C1 | 3/1997 |
| DE | 200 15 402 U1 | 2/2001 |
| EP | 1 022 201 A1 | 7/2000 |
| JP | 10258702 | 9/1998 |
| JP | 2002053007 | 2/2002 |
| JP | 2002053008 | 2/2002 |
| JP | 2003019945 | 1/2003 |

* cited by examiner

*Primary Examiner*—Peter M. Cuomo
*Assistant Examiner*—Stefan Kruer
(74) *Attorney, Agent, or Firm*—Foley & Lardner LLP

(57) ABSTRACT

A seat belt system includes a retractor and a seat belt. The retractor includes a motor that drives a pressure rod into a seat belt such that the seat belt is nipped between the pressure rod and belt receiving portions. The driving force of the motor that controls the movement of the pressure rod is set based on the situation at the time of a collision. Thus, the load limit to be exerted on the seat belt is set flexibly and widely according to the situation in an emergency. Further, the motor and the pressure piston rod can be activated repeatedly and, therefore, can be reused.

14 Claims, 7 Drawing Sheets

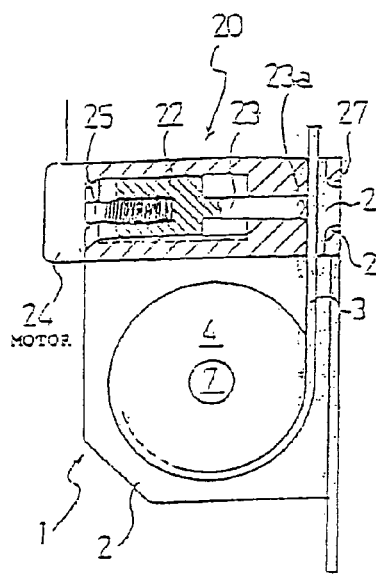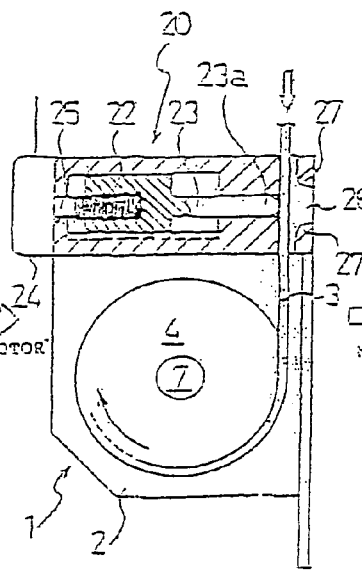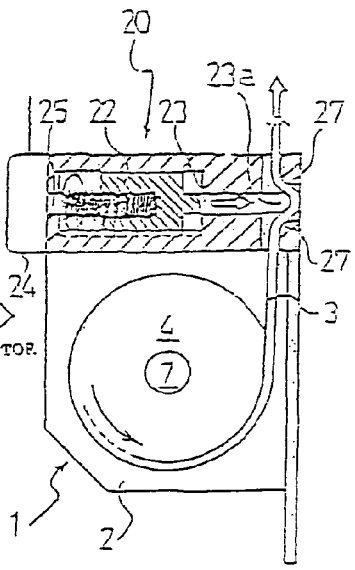
FIG. 2A  FIG. 2B  FIG. 2C
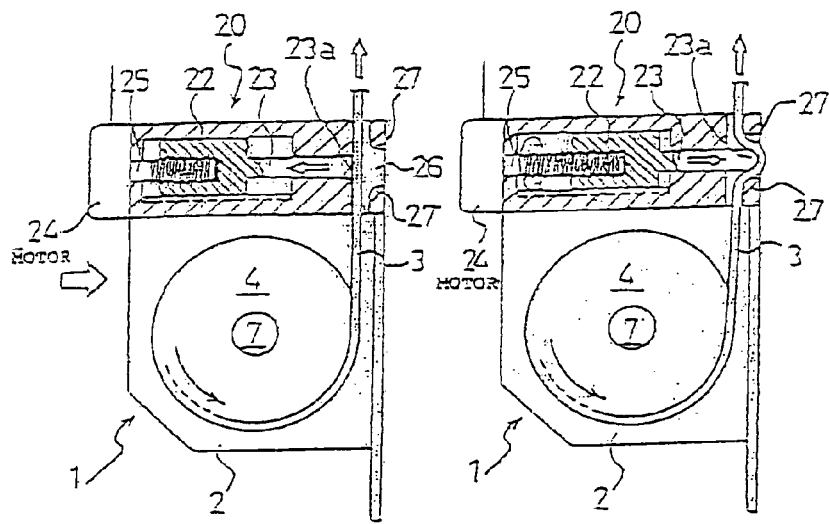
FIG. 2D  FIG. 2E

SEAT BELT RETRACTOR

BACKGROUND

The present invention relates to a seat belt retractor for retracting a seat belt, i.e., the seat belt retractor is configured to enable a seat belt to be withdrawn from it in certain circumstances and is configured to retract the seat belt in other circumstances. More specifically, the present invention relates to a seat belt retractor including an energy absorption ("EA") mechanism for absorbing and alleviating impact energy of the occupant. Conventionally, the energy is absorbed by limiting a load that is exerted on the seat belt by means of a torsional deformation of a torsion bar; the deformation of the torsion bar prevents the seat belt from being withdrawn in an emergency such during a collision.

During the aforementioned emergency, large vehicle decelerations occur, and accordingly, the occupant is moved forward due to inertia. Consequently, a heavy load is exerted on the seat belt. As a result, the occupant receives a large impact force from the seat belt. Though this impact force is not a particular problem for the occupant, limiting this impact force is preferable for the occupant.

Seat belt systems (including seat belt retractors) provided in vehicles such as automobiles prevent occupants from flying from a seat and, therefore, protect the occupants by restraining them in the aforementioned emergency. Seat belt retractors retract a seat belt onto a spool when an occupant does not wear the seat belt. By way of contrast, when the seat belt is worn, the seat belt is withdrawn from the spool. As part of these seat belt retractors, a locking mechanism acts in the aforementioned emergency and prevents rotation in a seat belt-withdrawing direction of the spool, thereby preventing the seat belt from being withdrawn. Thus, the seat belt can firmly retain and protect the occupant.

To this end, some conventional seat belt retractors (such as that disclosed in Japanese Unexamined Patent Application Publication No. 2001-58559) have been developed with an arrangement wherein the load that is exerted on the seat belt is limited by providing a torsion bar. As a result of the torsion bar, impact energy is absorbed and alleviated while the occupant wears a seat belt in an emergency.

FIG. 5 is a longitudinal sectional view illustrating an embodiment of the seat belt retractor disclosed in Japanese Unexamined Patent Application Publication No. 2001-58559. In the drawing: (a) 1 denotes a seat belt retractor; (b) 2 denotes a frame in the shape of a square with one end open; (c) 3 denotes a seat belt; (d) 4 denotes a spool rotatably supported between both side walls of the frame 2 in the shape of a square with one end open to retract the seat belt 3; (e) 5 denotes deceleration sensing means for detecting large vehicle decelerations such as during the aforementioned emergency; (f) 6 denotes a locking mechanism that is activated by the deceleration sensing means 5 to prevent the spool 4 from rotating in the belt-withdrawing direction; (g) 7 denotes a torsion bar for loosely fitting, penetrating, and rotationally interlocking the spool 4 and locking mechanism 6 in an axial direction centered on the spool 4; (h) 8 denotes spring means for constantly pressing the spool 4 in a belt-retracting direction via a bush 10 with the spring force of a spiral spring 9; (i) 11 denotes a pretensioner for acting in the aforementioned emergency so as to generate a belt retracting torque; 0) 12 denotes a bush for transmitting the seat belt retracting torque of the pretensioner 11 to the spool 4; (k) 15 denotes a male screw shank 15 that is formed on the locking base 14; and (1) 16 denotes a nut-shaped stopper member 16 screwed onto the male screw shank 15 for rotating integrally with the spool 4.

The locking mechanism 6 comprises a locking base 14 and a lock gear 6a. The locking base 14 is capable of rotating integrally with a later-described first torque transmitting member 17 of the torsion bar 7, for supporting a pawl 13 so as to be oscillated. The lock gear 6a, which normally rotates integrally with the torsion bar 7, in an emergency stops rotation by operation of the deceleration sensing means 5. During such an emergency, the lock gear 6a generates a relative rotational difference that causes the pawl 13 to engage with an internal gear 19 of the side wall of the frame 2. As a result, rotation of the locking base 14 is prevented, i.e., the spool 4 can not rotate in the belt-withdrawing direction.

The torsion bar 7 is formed with: (a) a first torque transmitting member 17 for engaging with the locking base 14 so as not to perform relative rotation; and (b) a second torque transmitting member 18 for engaging with the spool 4 so as not to perform relative rotation.

The spool 4 is constantly pressed in the belt-retracting direction by the spring force of the spring means 8 via the bush 10, torsion bar 7, the second torque transmitting member 18 of the torsion bar 7, and bush 12. Also, the belt retracting torque generated at the pretensioner 11 is transmitted to the spool 4 via the bush 12 at the time of operation of the pretensioner 11 and, therefore, the spool 4 retracts the seat belt 3 by a predetermined length.

With the conventional seat belt retractor 1 thus configured, the seat belt 3 is completely retracted by the pressing force of the spring means 8 when the occupant does not wear the seat belt 3. When the occupant withdraws the seat belt 3 to wear it, the spool 4 rotates in the belt-withdrawing direction, and the seat belt 3 is smoothly withdrawn. A buckle tongue (not shown in FIG. 5), which is slidably provided on the seat belt 3, is inserted in a buckle latch (not shown in FIG. 5) fixed to the vehicle so as to be latched. Finally, the seat belt 3 is partially retracted in the belt-retracting direction so as to fit snugly against the occupant while not constricting the occupant.

During an emergency, the seat belt retracting torque generated at the pretensioner 11 is transmitted to the spool 4, the spool 4 retracts the seat belt 3 by a predetermined length, and restrains the occupant firmly. On the other hand, the locking mechanism 6 is activated by operation of the deceleration sensing means 5 due to the large vehicle deceleration that occurs in an emergency. In other words, rotation of the locking gear 6a in the belt-withdrawing direction is prevented by operation of the deceleration sensing means 5 by forcing the pawl 13 of the locking mechanism 6 to rotate and engage with the internal gear 19 on the side wall of the frame 2. Thus, rotation of the locking base 14 in the belt-withdrawing direction is prevented. Accordingly, the torsion bar 7 is subjected to torsion and only the spool 4 rotates relative to the locking base 14 in the belt-withdrawing direction. Thereafter, the spool 4 rotates in the belt-withdrawing direction while subjecting the torsion bar 7 to torsion. The torsion torque of the torsion bar 7 limits load to be exerted on the seat belt 3, and consequently, the impact that would otherwise be exerted on the occupant is absorbed and alleviated.

The stopper member 16, which rotates integrally with the spool 4, rotates relative to the male screw shank 15 and, accordingly, moves toward the locking base 14. Subsequently, when the stopper member 16 contacts the locking base 14, further rotation of the stopper member 16 is prevented and, therefore, further rotation of the spool 4 is also prevented and torsion of the torsion bar 7 is stopped. Thus, the seat belt 3 is prevented from withdrawing, the occupant is firmly restrained by the seat belt 3, and the maximum torsion of the torsion bar 7 is limited, thereby preventing the torsion bar 7 from being sheared as a result of the torsion applied thereto.

This conventional seat belt retractor 1 is configured such that the locking base 14 of the locking mechanism 6 rotates relative to the locking gear 6a in the belt-withdrawing direction even in the event that the seat belt is rapidly withdrawn. Thus, when the pawl 13 of the locking mechanism 6 is engaged with the internal gear 19 on the side wall of the frame 2 as previously described, rotation of the locking base 14 is prevented, rotation of the spool 4 in the belt-withdrawing direction is prevented via the torsion bar 7, and consequently, the seat belt 3 is prevented from withdrawing.

Furthermore, in Japanese Unexamined Patent Application Publication No. 2001-58559, a seat belt retractor 1 is disclosed wherein the load limit (FL load) can be switched. More specifically, as shown in FIG. 6, in the initial stage following a collision, a locking member 38 pops out from a cylinder member 37 due to the spring force of a spring 39 acting upon a lock pin 40 that is blown away by gas discharged from the pretensioner 11 (not shown in FIG. 6). Thus, a ratchet pawl 35a of a lock wheel 35 is engaged with the locking member 38, and the lock wheel 35 is prevented from rotating in a belt-withdrawing direction. Consequently, a second torsion bar 32 is subjected to torsion at a portion of length l1 shorter than the total length θ. Thus, EA operation due to the EA mechanism is started by means of torsion of the first torsion bar 7 and torsion of the second torsion bar 32; the FL load $F_1$ at this time is relatively large, as shown in FIG. 7.

The second torsion bar 32 is subjected to fracture due to a predetermined amount of torsion. As a result, after the fracture of the second torsion bar 32, the EA operation is performed only by the first torsion bar 7; the FL load $F_2$ at this time is relatively small compared to the FL load $F_1$ at the initial stage, as shown in FIG. 7. Thus, the FL load is switched and, therefore, the load limit to be exerted on the seat belt can be set flexibly and widely, depending on the restraining state of the occupant in an emergency by an airbag, and the like.

However, while the seat belt retractor 1 disclosed in Japanese Unexamined Patent Application Publication No. 2001-58559 can set the load limit widely depending on the restrained status of the occupant, the load limit at the initial stage following a collision is set with only one kind of load limit. With the initial stage following a collision, impact energy to be exerted on the occupant is large. However, this impact energy varies widely depending on the weight of the occupant, the slide position of the seat, the collision speed, the manner of the collision, and the like. Thus, it is difficult to restrain the occupant more effectively and appropriately by handling large impact energy that varies widely at the initial stage with only one kind of load limit.

Accordingly, the present invention has been made in light of the aforementioned problems. It is an object of the present invention to provide a seat belt retractor including load limit setting means that is capable of flexibly and widely setting the load limit to be exerted on a seat belt depending on the situation in an emergency. Moreover, it is a further objection of the present invention to provide a seat belt retractor in which the aforementioned load limit setting means is reusable.

SUMMARY

An embodiment of the present invention addresses a seat belt retractor that includes, among other possible things: a spool for retracting a seat belt; a locking mechanism including a locking member of which rotation in a belt-withdrawing direction is prevented in an emergency; and first and second seat belt load limiting mechanisms for limiting a load to be exerted on the seat belt when rotation of the locking member in the belt-withdrawing direction is prevented with the spool rotating relative to the locking member in the belt-withdrawing direction. The second seat belt load limiting mechanism includes, among other possible things: load limit setting means for setting a load limit for the seat belt; and load limit control means for controlling the load limit setting means to change the load limit of the seat belt in an emergency based on the situation in the emergency. The load limit setting means is configured to be reused.

According to another embodiment of the invention, the first seat belt load limiting mechanism may be a torsion bar provided between the spool and the locking member.

According to another embodiment of the invention, the first seat belt load limiting mechanism may be a load limiting mechanism for drawing a wire rod provided on either a spool side or a locking base side and through engagement pins provided on the other side.

According to another embodiment of the invention, the first seat belt load limiting mechanism may be a load limiting mechanism for forcing a band plate provided on either one of a spool side and a locking base side to be forcibly deformed by a guide slot provided on the other side.

According to another embodiment of the invention, the first seat belt load limiting mechanism may be a load limiting mechanism for subjecting a tubular member provided on either one of a spool side and a locking base side to plastic deformation with a latching portion provided on the other side.

According to another embodiment of the invention, the first seat belt load limiting mechanism may be a load limiting mechanism for subjecting a U-shaped flat plate material of which one end is provided on either one of a spool side and a locking base side and the other end of which is engaged with the other side.

According to another embodiment of the invention, the first seat belt load limiting mechanism may be a load limiting mechanism for subjecting a shear pin provided between a spool and a locking base to shear fracturing.

According to another embodiment of the invention, the first seat belt load limiting mechanism may be an energy absorption mechanism for cutting a section to be cut provided on either a spool side and a locking base side with a cutting blade provided on the other side.

According to another embodiment of the invention, the first seat belt load limiting mechanism may be a load limiting mechanism for severing a plate-shaped energy absorption member provided on either a spool side and a locking base side with a severing protrusion provided on the other side.

According to another embodiment of the invention, the load limit of the seat belt is set in an emergency to one of three modes: (a) an inoperative load mode; (b) a light load mode; (c) and a heavy load mode. Accordingly, the occupant may be restrained and protected more efficiently at the time of a collision.

Another embodiment of the invention addresses a seat belt retractor that includes, among other possible things: a spool for retracting a seat belt; a locking mechanism including a locking member of which rotation in a belt-withdrawing direction is prevented in an emergency; a first seat belt load limiting mechanism that is configured to define a first load limit on the seat belt; and a second seat belt load limiting mechanism that is programmable to define a second load limit on the seat belt. The first and second load limits in sum define a load limit on the seat belt. The first and second seat belt load limiting mechanisms are configured to limit a load to be exerted on the seat belt when rotation of the locking member in the belt-withdrawing direction is prevented during the emergency.

According to another embodiment of the invention, the seat belt retractor may include a programmable force limiter ("PFL") for changing the load limit of a seat belt in an emergency based on the situation. The situation may be gleaned from information ascertained before the emergency (e.g., the weight of the occupant, the slide position of the seat, and the like) and from information ascertained during the emergency (e.g., collision speed, manner of collision, and the like). The load limit of the seat belt in the emergency can accordingly be set flexibly and widely to correspond to the situation in the emergency. Thus, the occupant can be restrained and protected more effectively and appropriately at the time of a collision.

According to another embodiment of the invention, the load limit setting means may be activated repeatedly. As a result, even if the load limit setting means is once activated, there is no need to replace it with new load limit setting means, and it can be reused without any change, thereby enabling a reduction in operating costs.

According to another embodiment of the invention, the first seat belt load limiting mechanism may be configured of an existing load limiting mechanism, thereby reducing manufacturing costs. Further, the first seat belt load limiting mechanism may have a simple configuration, thereby further reducing manufacturing costs.

Another embodiment of the invention addresses a seat belt system that includes, among other possible things: a seat belt comprising a tongue; a seat belt buckle comprising a latch configured to releasably engage the tongue; and a seat belt retractor configured to retract the seat belt on a spool provided in the seat belt retractor. The seat belt retractor includes, among other possible things: a locking mechanism including a locking member a rotation of which in a belt-withdrawing direction is prevented in an emergency; a first seat belt load limiting mechanism that is configured to define a first load limit on the seat belt; and a second seat belt load limiting mechanism that is programmable to define a second load limit on the seat belt. The first and second load limits in sum define a load limit on the seat belt. The first and second seat belt load limiting mechanisms are configured to limit a load to be exerted on the seat belt when rotation of the locking member in the belt-withdrawing direction is prevented during the emergency.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIGS. 2A-2E explain the setting of the load mode of a PFL shown in FIG. 1A; FIGS. 2A-2$d$ describe the setting of the light load mode; and FIGS. 2A, 2B, 2D, and 2E describe the setting of the heavy load mode;

DETAILED DESCRIPTION

Figure 1A:
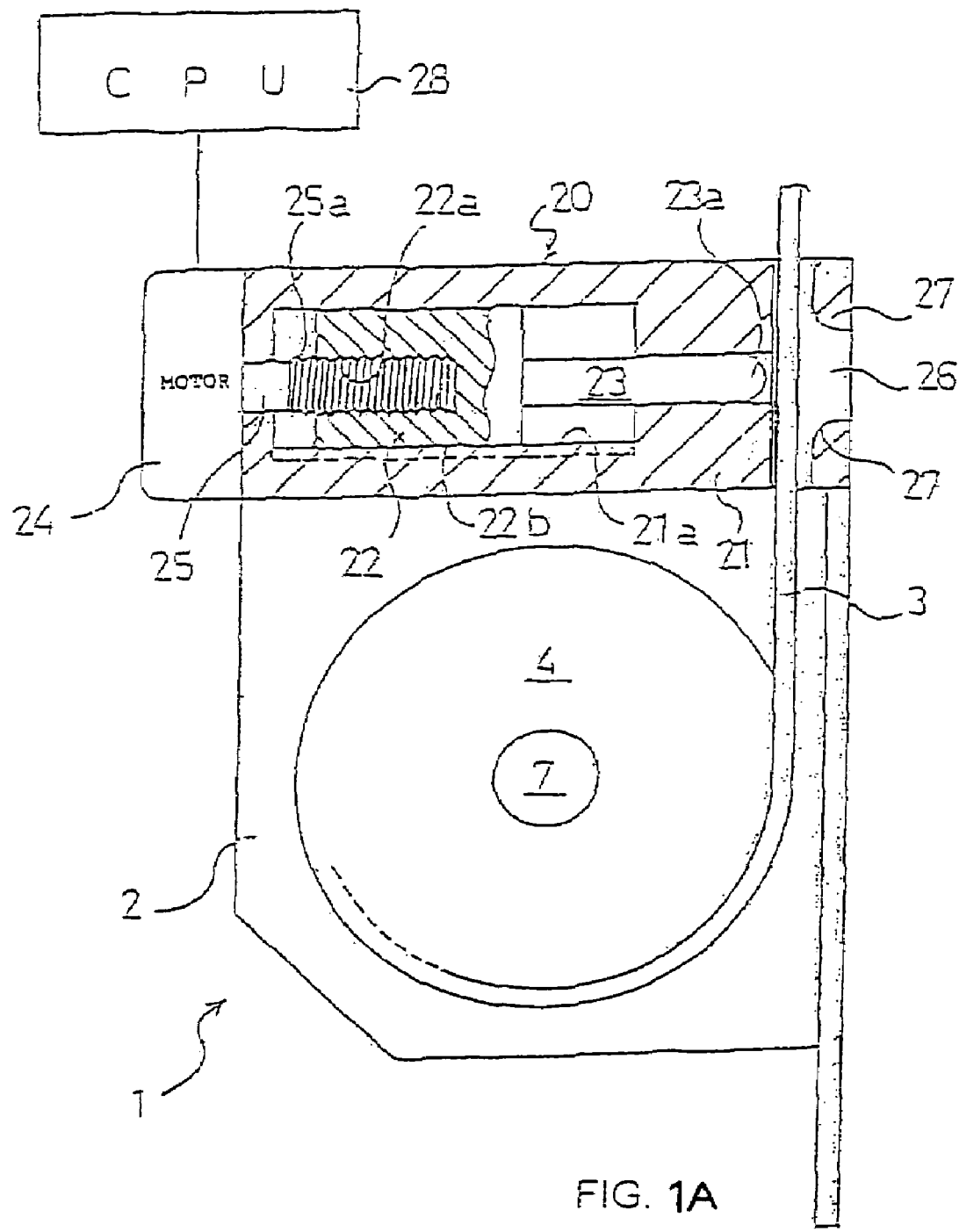
FIG. 1A shows an embodiment of a seat belt retractor according to the present invention with the configuration partially omitted.

Embodiments of the present invention will be described hereinafter with reference to the drawings. FIG. 1A is a diagram illustrating an embodiment of a seat belt retractor according to the present invention of which part of the configuration is omitted. The same components as those of the conventional seat belt retractor 1 shown in FIG. 5 are denoted with the same reference numerals, and the description thereof is omitted. Moreover, non-discussed configurations and operations of the seat belt retractor 1 shown in FIGS. 1-4 may be the same as that of the conventional embodiment shown in FIG. 5.

As shown in FIG. 1A, the seat belt retractor 1 of this embodiment, as with the seat belt retractor 1 of the conventional embodiment shown in FIG. 5, includes: (a) a frame 2 in the shape of a square with one end open; (b) a seat belt 3; (c) a spool 4 for retracting the seat belt 3; and (d) a torsion bar 7 that may be referred to as a first seat belt load limiting mechanism. Also, though not shown in the drawing, the seat belt retractor 1 of this embodiment, as with the seat belt retractor 1 shown in FIG. 5, includes deceleration sensing means 5, a locking mechanism 6, spring means 8, a pretensioner 11, and a bush 12 for transmitting the seat belt retracting torque of the pretensioner 11 to the spool 4.

Figure 1B:
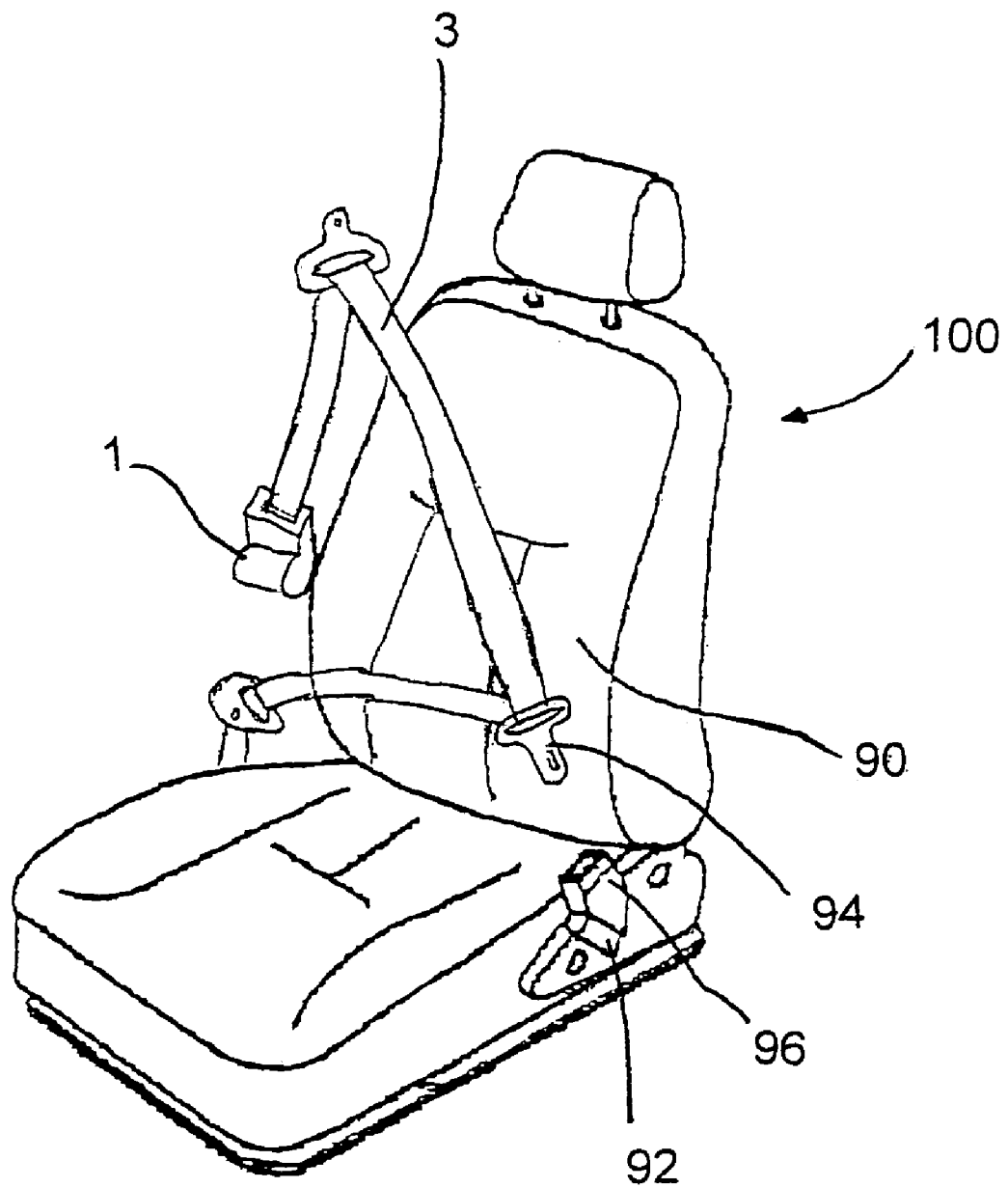
FIG. 1B is a schematic drawing showing a seat belt system that includes the seat belt retractor and seat belt shown in of FIG. 1A, a tongue on the seat belt and an associated buckle that includes a latch.

The seat belt retractor 1 is shown in FIG. 1B as being positioned on one side of a seat 90. On an opposite side of the seat 90, there is provided an buckle 92. The buckle 92 has a latch 96 that is configured to receive a tongue 94 attached to the seat belt 3. Together, the seat belt retractor 1, the seat belt 3, and the buckle/tongue 92/94 engagement define a seat belt system 100 according to the present invention.

The seat belt retractor 1 of this embodiment also includes a programmable force limiter ("PFL") 20 that is disposed above the spool 4 and fixed to the frame 2. Note that the pretensioner 11 in FIG. 5 is disposed above the spool 4. In contrast, in the case of the seat belt retractor 1 of the FIG. 1A embodiment, as the PFL 20 is disposed above the spool 4, the pretensioner 11 is disposed below the spool 4, though not shown in the drawing.

The PFL 20 can change and set the seat belt load limit (also referred to as the "FL load") to be applied to seat belt more flexibly according to the situation in an emergency.

The situation at the time of the collision may be ascertained from information ascertained before the collision (e.g., the weight of the occupant, the slide position of the seat 90, and the like) and information ascertained at the time of the collision (e.g., the collision speed, the manner of collision, and the like).

The PFL 20 includes: (a) a main body 21; (b) a pressure piston 22 that is slidably provided within the main body 21 and that includes a female screw 22a; (c) a pressure rod 23 that is fixed to this pressure piston 22 and that is provided within the main body 21 integrally and slidably with the pressure piston 22; (d) an electric motor 24 attached to the main body 21; (e) a driving shaft 25 that is connected to a rotational shaft of the motor 24 so as to rotate integrally with the rotational shaft and that includes a male screw 25a that is screwed with the female screw 22a of the pressure piston 22; (f) a T-shaped opening 26 provided in the main body 21 so that the seat belt 3 can movably pass therethrough and so that the pressure rod 23 can enter thereinto; and (g) belt receiving portions 27 for receiving the seat belt 3. Furthermore, a central processing unit ("CPU") 28, which may also be referred to as a load limit control means, is connected to the motor 24. The CPU 28 controls the driving of the motor 24 that, in turn, controls the PFL 20.

Upon the motor 24 driving and the driving shaft 25 rotating, the pressure piston 22 moves in the axial direction of the shaft (i.e., in the left and right directions in FIG. 1A). To prevent the pressure piston 22 from rotating in accordance with the rotation of the driving shaft 25, a guide slot 22b may be formed on the pressure piston 22 in the axial direction of the shaft and a guide rail 21a may be provided in the main body 21; the guide rail 21 is sized to engage the guide slot 22b. As a result, rather than rotating, the pressure piston 22 moves in the axial direction of the shaft along the guide rail 21a. Of course, the means by which the rotation of the pressure piston 22 is prevented are not limited to this disclosed embodiment and, accordingly, any other means for preventing rotation of the pressure piston 22 may be employed.

Upon the movement of the pressure piston 22 (rightward in FIG. 1A), the pressure rod 23 correspondingly moves (rightward in FIG. 1A) and a tip 23a of the pressure rod 23 contacts and presses against the seat belt 3. Thus, the seat belt 3 is nipped between the tip 23a of the pressure rod 23 and the belt receiving portions 27 (as later described in detail). The tip 23a of the pressure rod 23 may be formed as a hemispheric curved surface and the edge portion of the belt receiving portions 27 may be formed roundly so that the seat belt 3 is not damaged when it is nipped.

The load exerted by the PFL 20 on the seat belt 3 due to this nipping of the seat belt 3 defines a PFL load limit (also referred to as a "PFL load"). Accordingly, the PFL 20 defines a load limit setting means according to the present invention. Moreover, the load mode is in three stages of the FL load that are set to the seat belt retractor 1 of this embodiment: (1) a load mode due to inoperative PFL 20; (2) a light load mode; and (3) heavy load mode. Each of these stages will hereafter be discussed in detail.

Figure 3:
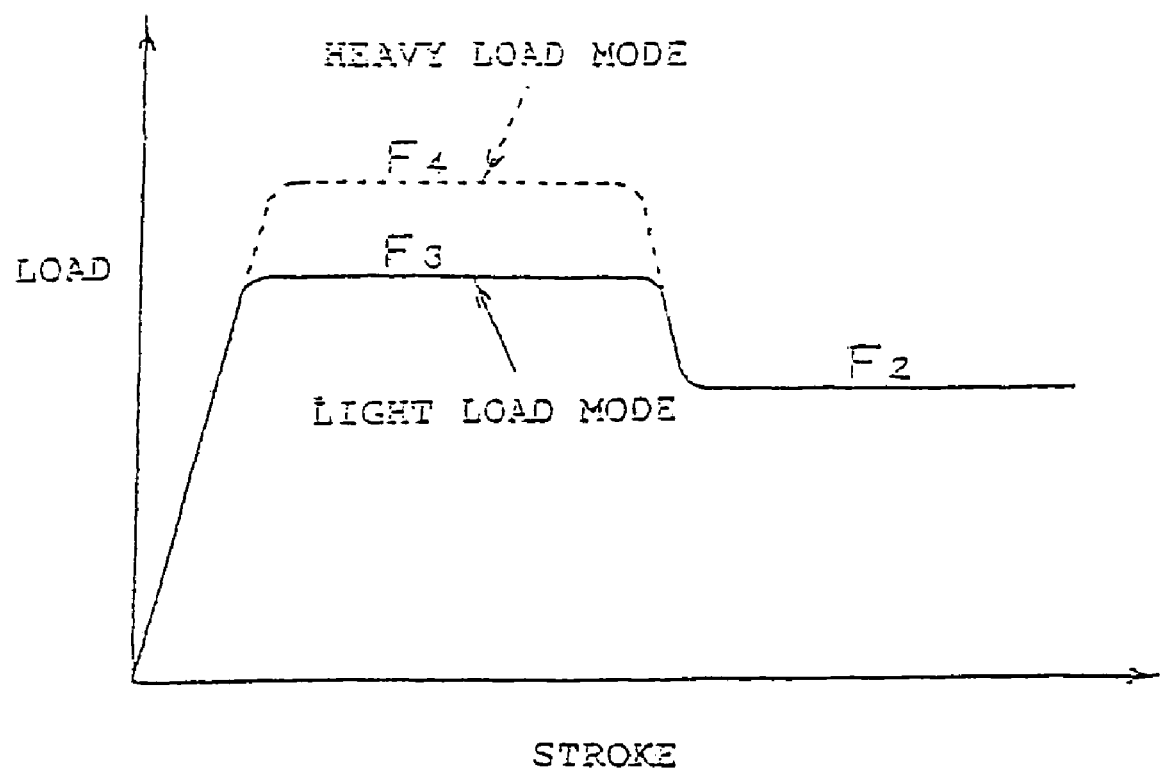
FIG. 3 shows the properties of the FL load shown in FIG. 1A.

(1) The load mode due to inoperative PFL 20 is a load mode due to torsion of the torsion bar, in which the PFL 20 does not activate (i.e., the inoperative status shown in FIG. 1A). In other words, an EA operation is performed only by torsion of the torsion bar 7, and the FL load $F_2$ at this time is small as shown in FIG. 3.

(2) The light load mode is a load mode in which the driving force of the motor 24 is set so as to be relatively small. More specifically, with the inoperative status of the PFL 20 shown in FIG. 2A, the pretensioner 11 is activated due to collision, the spool 4 rotates in the belt-retracting direction so as to retract the seat belt 3 as indicated in FIG. 2B, and the occupant is restrained by the pretensioner 11 in the same way as with the conventional embodiment.

Next, upon operation of the pretensioner 11 being completed as shown in FIG. 2C, the seat belt 3 is withdrawn due to inertia of the occupant as with the conventional embodiment (i.e., the torsion bar 7 is subjected to torsion) and the motor 24 is driven. Thus, both pressure piston 22 and pressure rod 23 are driven (rightward in FIG. 2C) by the motor 24. The seat belt 3 is nipped between the tip 23a of the pressure rod 23 and belt receiving portions 27 by the movement of the pressure rod 23. At this time, the driving force of the motor 24 is set small, and accordingly, the nipping force for the seat belt 3 is comparatively small. Accordingly, friction between the pressure rod 23 and belt receiving portions 27 becomes comparatively small, and the light load mode, of which load for the seat belt 3 is small, is set. With this light load mode, PFL load is comparatively small. Accordingly, in this case, the FL load $F_3$ of the seat belt 3, which is made up of this small PFL load and load due to the torsion of the torsion bar 7, is comparatively small as shown by the solid line in FIG. 3.

Next, upon the motor 24 being rotated in reverse, both the pressure piston 22 and the pressure rod 23 move in the reverse direction (i.e., leftward in FIG. 2D), and reach the inoperative position shown in FIG. 2D. Thus, the operation of the PFL 20 is completed, the tip 23a of the pressure piston 23 is separated from the seat belt 3, and the nipping force for the seat belt 3 is released. Thereafter, as with the conventional embodiment, an EA operation is performed by only the torsion bar 7 being subjected to torsion, and the previously discussed load mode due to inoperative PFL 20 is set. Accordingly, the FL load $F_3$ at this time is small as shown in FIG. 3.

(3) The heavy load mode is a load mode in which the driving force of the motor 24 is set so as to be comparatively large. More specifically, as with the case of the aforementioned light load mode, both pressure piston 22 and pressure rod 23 are driven (rightward in FIG. 2B) by the motor 24, and the seat belt 3 is nipped between the tip 23a of the pressure rod 23 and the belt receiving portions 27. At this time, as the driving force of the motor 24 is set large, as shown in FIG. 2E, the amount of rightward movement of the pressure piston 22 and pressure rod 23 is greater than that in the case of the aforementioned light load mode, and consequently, the nipping force for the seat belt 3 is larger. Thus, friction between the pressure rod 23 and belt receiving portions 27 is larger, and the heavy load mode, of which the load for the seat belt 3 is larger, is set. With this heavy load mode, PFL load is comparatively large. Accordingly, in this case, the FL load $F_4$ of the seat belt 3, which is made up of this large PFL load and load due to the torsion of the torsion bar 7, is comparatively large as shown in the dashed line in FIG. 3.

Next, as with the light load mode, upon the motor 24 being rotated in reverse, both the pressure piston 22 and the pressure rod 23 reach the inoperative position shown in FIG. 2A, the operation of the PFL 20 is completed, and the nipping force for the seat belt 3 is released. Thereafter, as with the conventional embodiment, an EA operation is performed by only the torsion bar 7 being subjected to torsion, and the previously discussed load mode due to inoperative PFL 20 is set. Accordingly, the FL load $F_2$ at this time is small as shown in FIG. 3.

Thus, the PFL 20 of the seat belt retractor of this embodiment is a friction-load-type PFL that can be activated repeatedly by controlling the rotational direction of the motor 24.

Figure 4:
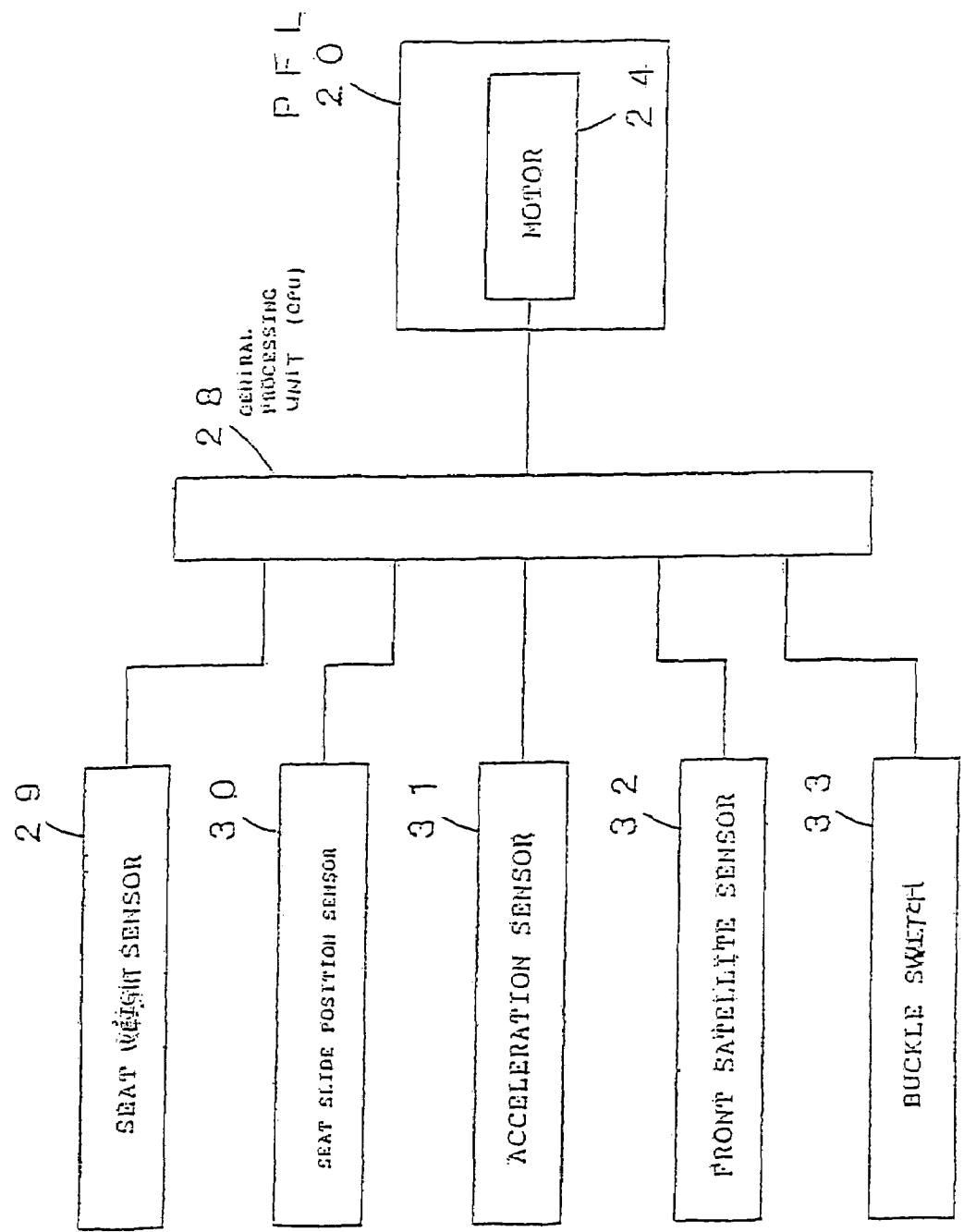
FIG. 4 is a block diagram for setting the seat belt retractor 1 shown in FIG. 1A with the heavy and light load modes.
Figure 5:
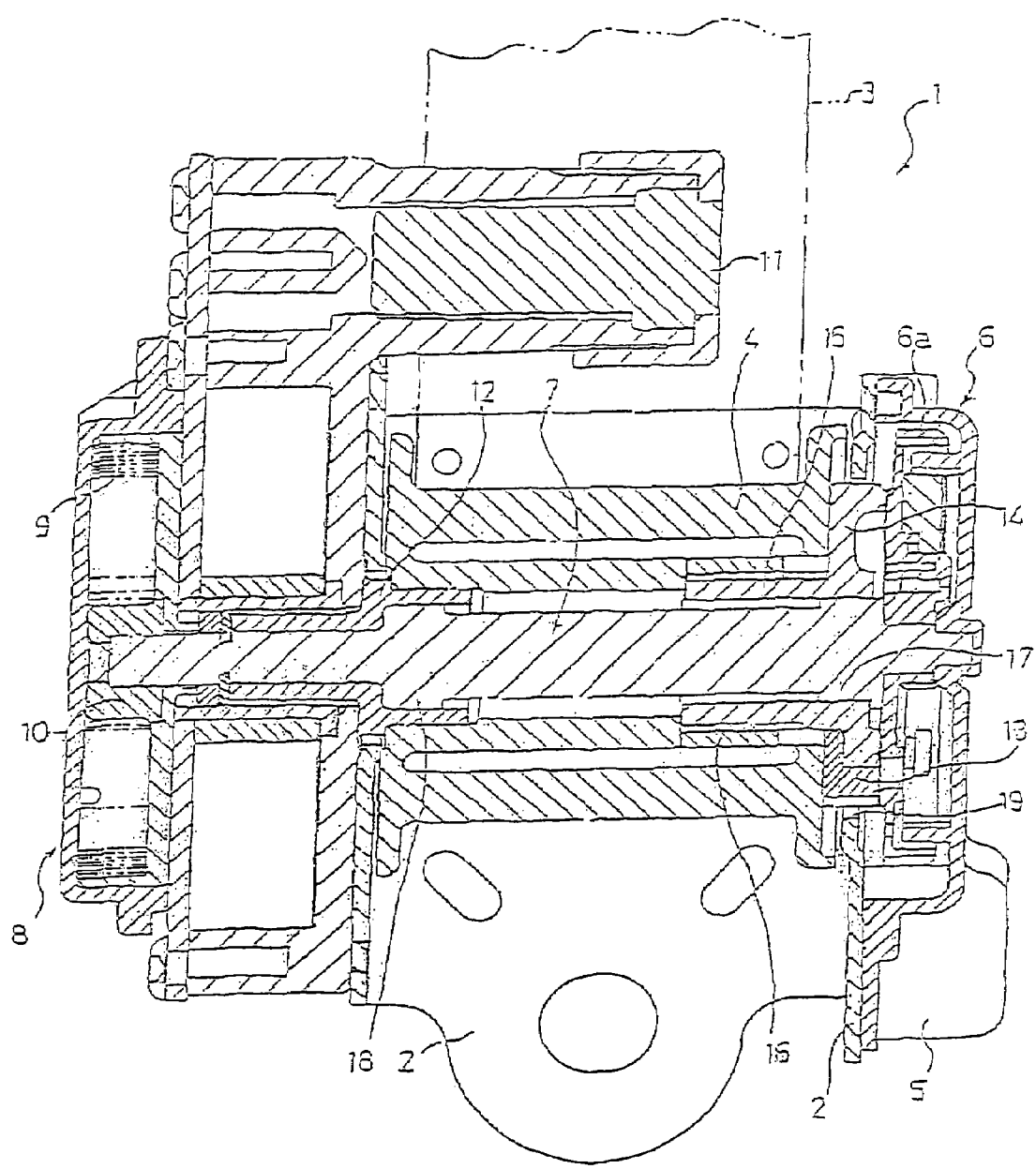
FIG. 5 is a longitudinal sectional view illustrating an embodiment of a conventional seat belt retractor including a torsion bar.
Figure 6:
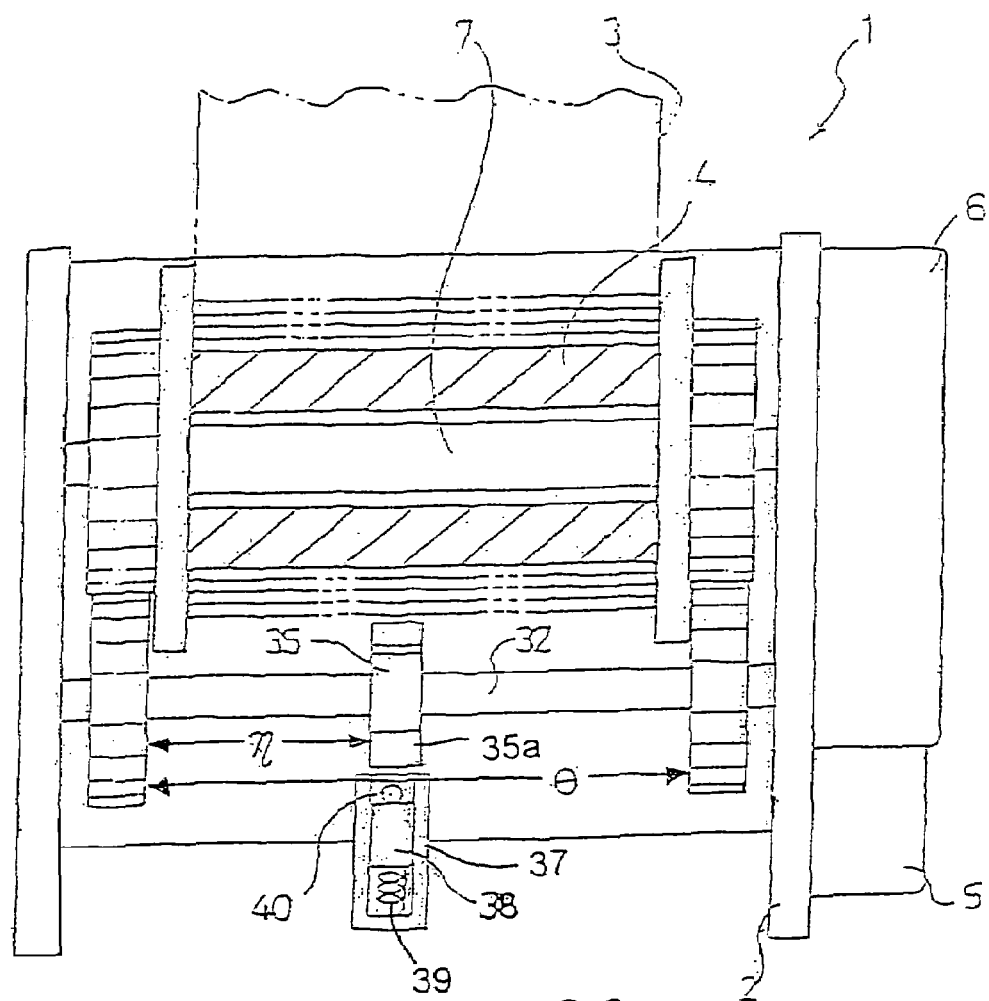
FIG. 6 shows an embodiment of a conventional seat belt retractor including a torsion bar schematically.
Figure 7:
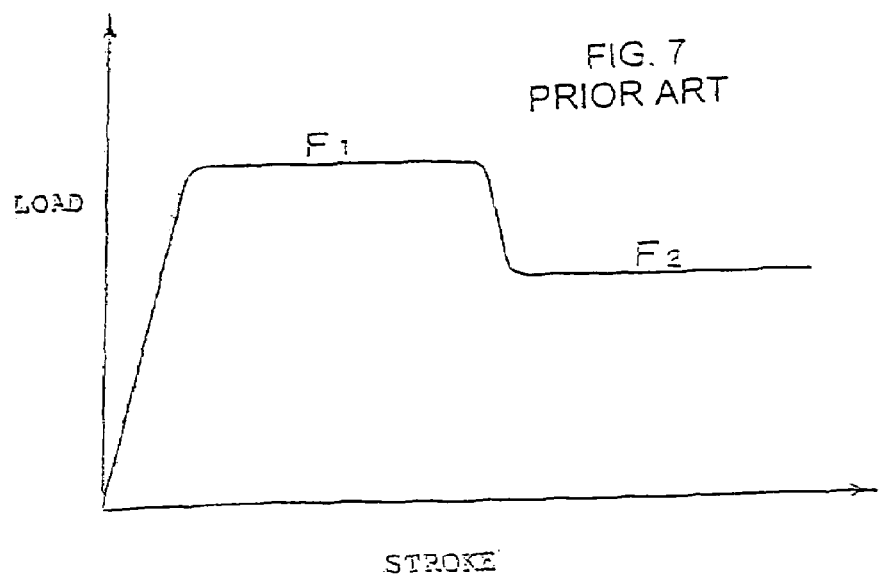
FIG. 7 shows the properties of the FL load of the conventional seat belt retractor embodiment shown in FIG. 6.

FIG. 4 is a block diagram for setting the seat belt retractor 1 of this embodiment to the aforementioned three load modes. To set the three load modes, the CPU 28 stores the predetermined conditions for activating the PFL 20. Subsequently, the CPU 28 changes the FL load at the time of a collision based on information ascertained before a collision (e.g., the weight of the occupant, the slide position of the seat 90, and the like).

Accordingly, as shown in FIG. 4, the CPU 28 is connected to the motor 24 as previously described. The CPU 28 is also connected to: (a) a seat weight sensor 29 for detecting the seat load on a vehicle seat 90, i.e., the weight of the occupant; (b) a seat slide position sensor 30 for detecting the slide position of the vehicle seat 90; (c) an acceleration sensor 31 for detecting the acceleration of the vehicle; (d) a front satellite sensor 32 for detecting the horizontal manner of collision at the front portion of the vehicle; and (e) a buckle switch 33 that is turned on when the tongue 92 of a seat belt 3 buckle is engaged with the latch 96 of the buckle 92.

The CPU 28 sets the seat belt retractor 1 with any one of the aforementioned load modes in three stages by controlling the motor 24 to turn on (driving) or off (non-driving) following the conditions for activating the PFL 20. The conditions for activating the PFL 20 are based on the information ascertained before a collision based on detection signals from the seat weight sensor 29, seat slide position sensor 30, acceleration sensor 31, and front satellite sensor 32. Description will now be made more specifically regarding the conditions for activating the PFL 20.

(a) Conditions for activating the PFL 20 based on the weight of the occupant who sits on the vehicle seat 90. These conditions are conditions for determining which of the aforementioned three stage load modes is to be set based on the weight of the occupant who sits on a vehicle seat 90. That is to say: (i) in the case of a light and/or small occupant, the load mode is set to inoperative PFL 20; (ii) in the case of a middle-weight average occupant, the light load mode is set; and (iii) in the case of a heavy and large occupant, the heavy load mode is set. The CPU 28 controls the motor 24 to turn on or off based on the weight information of the occupant by means of the detection signal from the seat weight sensor 29. These conditions for activation can be applied to the occupant who sits on any vehicle seat 90, and in particular, the passenger seat or a back seat.

(b) Conditions for activating the PFL 20 based on the forward or backward slide position of the vehicle seat 90. These conditions are conditions for determining which of the aforementioned three stage load modes is to be set based on the slide position of a vehicle seat 90. That is to say: (i) in the case of a small occupant whose seat position is forward, the load mode is set to inoperative PFL 20; (ii) in the case of a medium occupant whose seat position is around the middle, the light load mode is set; and (iii) in the case of a large occupant whose seat position is at the back, the heavy load mode is set. The CPU 28 controls the motor 24 to turn on or off based on the slide position of the vehicle seat 90 by means of the detection signal from the seat slide position sensor 30. These conditions for activation can be applied to the occupant who sits on a front seat, in particular, and is preferable for the driver sitting on the driver seat.

In an embodiment of the invention, whether the PFL 20 is allowed to act may be determined based on the on or off state of the buckle switch 33. More specifically, the CPU 28 may set the PFL 20 to an operative (i.e., light load or heavy load) when a seat belt tongue 94 is engaged with a seat belt buckle latch 96 as determined by the on/off signal from the buckle switch 33. On the other hand, the CPU 28 may set the PFL 20 to inoperative when the tongue 94 is not engaged with the buckle latch 96.

In an embodiment of the invention, the operation of the PFL 20 may be changed based on the severity of a collision. More specifically, the CPU 28 may determine whether the occupant is small, medium; or large based on the detection signal from the seat weight sensor 29 and/or the seat slide position sensor 30, and may also determine whether the collision is a low-speed collision (e.g., below 30 km/h) or middle/high-speed collision (e.g., 30 km/h or higher) based on the detection signal from the acceleration sensor 31. Subsequently, if the occupant is small, the CPU 28 may set the load mode to: (a) inoperative PFL 20 in the event of a low-speed collision; and (b) light load mode in the event of a middle/high-speed collision. Further, if the occupant is large, the CPU 28 may set the load mode to: (a) light load mode in the event of a low-speed collision; and (b) heavy load mode in the event of a middle/high-speed collision.

In an embodiment of the invention, the operation timing of the PFL 20 may be changed based on the severity of a collision. More specifically, the CPU 28 may determine whether the collision is a low-speed collision (e.g., below 30 km/h), a middle-speed collision (e.g., 30 to 40 km/h), or a high-speed collision (e.g., 40 km/h or higher) based on the detection signal from the acceleration sensor 31. Subsequently, in the event of a low-speed collision the CPU 28 may set the operation start timing of the PFL 20 to slow (e.g., 35 msec after collision). Similarly, in the event of a middle-speed collision the CPU 28 may set the operation start timing of the PFL 20 to comparatively slow (i.e., faster than that in the low-speed collision, e.g., 25 msec after collision). Finally, in the event of a high-speed collision, the CPU 28 may set the operation start timing of the PFL 20 to comparatively fast (e.g., 15 msec after collision). Note that following a collision, the operation start timing of the PFL 20 may be changed according to the crash severity. Also, the operation start timing of the PFL 20 may be changed with the fixed delay timing following the ignition of the pretensioner 11 along with the operation timing of the pretensioner 11.

In an embodiment of the invention, the operation of the PFL 20 may be changed based on the severity and manner of collision. More specifically, the CPU 28 may determine whether the collision is a collision offset to the right side or collision offset to the left side based on the detection signal from the acceleration sensor 31 and the detection signal from the front satellite sensor 32. Subsequently, the CPU 28, in the event of a collision offset to the right side (collision inclined to the right side of the vehicle), may set the operation start timing of the PFL 20: (a) to fast for the retractors of the right-side seats; and (b) to slow for the retractors of the left-side seats. Inversely, in the event of a collision offset to the left side (collision inclined to the left side of the vehicle), the CPU 28 may set the operation start timing of the PFL 20: (a) to fast for the retractors of the left-side seats; and (b) to slow for the retractors of the right-side seats.

Further, the CPU 28 may determine whether the collision is a right-side oblique collision or left-side oblique collision based on the detection signal from the acceleration sensor 31 and the detection signal from the front satellite sensor 32. Subsequently, the CPU 28, in the event of the right-side oblique collision, may set the operation start timing of the right side of the PFL 20 to fast and set the operation start timing of the left side of the PFL 20 slow. Inversely, in the event of the left-side oblique collision, the CPU 28 may set the operation start timing of the left side of the PFL 20 to fast and set the operation start timing of the right side of the PFL 20 to slow.

Thus, in light of these above-described control parameters, a second seat belt load limiting mechanism according to the present invention is defined by the PFL 20 and the CPU 28.

The seat belt retractor 1 as previously described comprises the PFL 20 for changing the load limit of the seat belt 3 at the time of a collision based on information ascertained before the collision (e.g., the weight of the occupant, the slide position of the seat 90, and the like), and information ascertained at the time of the collision that is reflective of the severity of the collision (e.g., the collision speed, the manner of collision, and the like). Accordingly, the FL load of the seat belt 3 at the time of a collision can be set more flexibly and widely to be reflective of the situation at the time of a collision. Thus, the occupant can be restrained and protected more effectively and appropriately at the time of a collision.

As the conventional torsion bar 7 serves as the first seat belt load limiting mechanism, the load limiting mechanism can be formed with a simple configuration and at low cost.

As the load mode of the seat belt retractor 1 may be set with the three load modes (i.e., load mode due to inoperative PFL 20, light load mode, and heavy mode), the load for the seat belt 3 may be controlled in three stages and, therefore, the occupant may be restrained and protected more efficiently at the time of a collision. It should be understood, however, that although three load modes are described and are set in three stages, the number of loads and stages is not so restricted. Rather, two or more loads and stages may be employed to set the load for the seat belt 3.

As the motor 24 enables the PFL 20 to be reactivated, the PFL 20 can be activated repeatedly. Accordingly, even if the PFL 20 is activated once, there is no need to replace it with a new PFL, i.e., it can be reused, thereby reducing operating costs. However, the pretensioner may need replacing depending on the number of times that it has been activated. Moreover, while the pretensioner 11 may be provided, the pretensioner 11 is not always needed and, therefore, may be omitted in some embodiments. However, to restrain and protect the occupant more effectively at the time of a collision, the pretensioner 11 is preferably included.

While description has been made regarding the case of a vehicle collision, in another embodiment of the invention the retractor may be activated in instances in which a collision is detected as being likely. For example, when a collision predicting sensor (e.g., (a) a relative distance sensor that detects the relative distance between the vehicle itself and an obstacle such as a forward obstacle or the like, (b) a relative speed sensor that detects a speed difference between the vehicle itself and the vehicle in front of it, (c) any of the aforementioned various sensors 29, 30, 31, and 32, etc.) predicts the possibility of collision with an obstacle, the motor 24 may be driven such that the load is exerted on the seat belt 3 by the PFL 20 as previously described. Moreover, after the collision is finished or if the collision is avoided, the PFL 20 may be returned to a non-activated state by rotating the motor 24 reversely. Moreover, the PFL 20 can be reactivated if the likelihood of another collision is detected.

While the torsion bar 7 is employed as the first seat belt load limiting mechanism, in another embodiment of the invention, an alternate EA mechanism may be used instead of the torsion bar 7. For example, the torsion bar 7 could be replaced by: (a) an EA mechanism for drawing a wire rod provided on the locking base side through among engagement pins provided on the spool side (see, e.g., Japanese Unexamined Patent Application Publication No. 2002-53007); (b) an EA mechanism for forcing a band plate of which one end is provided on the spool side to be deformed by a guide slot provided on the locking base side (see, e.g., Japanese Unexamined Patent Application Publication No. 2000-85527); (c) an EA mechanism for subjecting a tubular member provided on the spool side to plastic deformation with a latching portion provided on the locking base (see, e.g., Japanese Unexamined Patent Application Publication No. 2002-53008); (d) an EA mechanism for subjecting a U-shaped flat plate material of which one end is provided on the locking base side, and the other end is engaged with the spool side to deformation (see, e.g., Japanese Unexamined Patent Application Publication No. 10-258702); (e) an EA mechanism for subjecting a shear pin provided between the spool and the locking base to shear fracture at the time of rotational lock of the locking base in an emergency (see, e.g., Japanese Unexamined Patent Application Publication No. 2001-106025); and (f) an EA mechanism for cutting a section to be cut provided on the spool side with a cutting blade provided on the locking base side has been proposed (see, e.g., Japanese Unexamined Patent Application Publication No. 2001-106025). All of the aforementioned Japanese Unexamined Patent Application Publications are hereby incorporated by reference herein in their entireties. Further, an EA mechanism for severing a plate-shaped energy absorption member provided on the locking base side with a severing protrusion provided on the spool side (which has been subjected to application for patent by the Present Inventor, i.e., Japanese Unexamined Patent Application No. 2003-206807), may be employed as the first seat belt load limiting mechanism.

The seat belt retractor 1 according to the present invention can be advantageously employed in a seat belt system in a vehicle such as an automobile. As a result, the load exerted on the seat belt in an emergency such as a collision and so forth may be limited so that the impact energy exerted on the occupant is absorbed and alleviated, while the seat belt is prevented from being withdrawn.

The priority application, Japanese Application 2003-421083, which was filed Dec. 18, 2003, is incorporated herein by reference in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A seat belt retractor comprising:
   a spool for retracting a seat belt;
   a locking mechanism including a locking member of which rotation in a belt-withdrawing direction is prevented in an emergency; and
   first and second seat belt load limiting mechanisms for limiting a load to be exerted on the seat belt when rotation of the locking member in the belt-withdrawing direction is prevented with the spool rotating relative to the locking member in the belt-withdrawing direction, wherein the second seat belt load limiting mechanism comprises:

a load limit setting mechanism to set a load limit for the seat belt, wherein the load limit setting mechanism is configured to nip the seat belt against a belt recieving portion located in a main body of the load limit setting mechanism; and a load limit control mechanism to control the load limit setting mechanism to change a load limit of the seat belt in an emergency based on an emergency situation, and wherein the load limit setting mechanism is configured to be reused.

2. The seat belt retractor according to claim 1, wherein the first seat belt load limiting mechanism is a torsion bar provided between the spool and the locking member.

3. The seat belt retractor according to claim 1, wherein the first seat belt load limiting mechanism is a load limiting mechanism for drawing a wire rod provided on either a spool side or a locking base side and through engagement pins provided on an other of the spool side and the locking base side.

4. The seat belt retractor according to claim 1, wherein the first seat belt load limiting mechanism is a load limiting mechanism for forcing a band plate provided on either one of a spool side and a locking base side to be forcibly deformed by a guide slot provided on an other of the spool side and the locking base side.

5. The seat belt retractor according to claim 1, wherein the first seat belt load limiting mechanism is a load limiting mechanism for subjecting a tubular member provided on either one of a spool side and a locking base side to plastic deformation with a latching portion provided on an other of the spool side and the locking base side.

6. The seat belt retractor according to claim 1, wherein the first seat belt load limiting mechanism is a load limiting mechanism for subjecting a U-shaped flat plate material to deformation, whereby one end of said material is provided on either one of a spool side and a locking base side and the other end of which is engaged on an other of the spool side and the locking base side.

7. The seat belt retractor according to claim 1, wherein the first seat belt load limiting mechanism is a load limiting mechanism for subjecting a shear pin provided between a spool and a locking base to shear fracturing.

8. The seat belt retractor according to claim 1, wherein the first seat belt load limiting mechanism is an energy absorption mechanism for cutting a section provided on either a spool side and a locking base side with a cutting blade provided on an other of the spool side and the locking base side.

9. The seat belt retractor according to claim 1, wherein the first seat belt load limiting mechanism is a load limiting mechanism for severing a plate-shaped energy absorption member provided on a locking base side with a severing protrusion provided on a spool side.

10. The seat belt retractor according to claim 1, wherein the load limit of the seat belt is set in an emergency to one of three modes: (a) an inoperative load mode; (b) a light load mode; (c) and a heavy load mode.

11. The seat belt retractor according to claim 1, wherein the load limit setting mechanism includes a driving shaft and a pressure rod, the pressure rod directly contacting the seat belt to nip the seat belt against the belt receiving portion.

12. The seat belt retractor according to claim 10, wherein the inoperative load mode utilizes only the first seat belt load limiting mechanism.

13. The seat belt retractor according to claim 12, wherein the light load mode utilizes the first seat belt load limiting mechanism and the second load limit setting mechanism, wherein said second load limit setting mechanism nips the seat belt with a predetermined force.

14. The seat belt retractor according to claim 13, wherein the heavy load mode utilizes the first seat belt load limiting mechanism and the second load limit setting mechanism, wherein said second load limit setting mechanism nips the seat belt with a force greater than that of the of the light mode.

* * * * *